United States Patent [19]

Tsuchiya

[11] Patent Number: 4,528,606
[45] Date of Patent: Jul. 9, 1985

[54] DRIVING DEVICE FOR TAPE RECORDER

[75] Inventor: Tatsuhiko Tsuchiya, Kakuda, Japan

[73] Assignee: Alps Electric Co., Ltd., Japan

[21] Appl. No.: 431,019

[22] Filed: Sep. 30, 1982

[30] Foreign Application Priority Data

Dec. 7, 1981 [JP] Japan .......................... 56-182045[U]

[51] Int. Cl.³ .................. G11B 5/008; G11B 15/32;
G11B 15/00; G03B 1/04
[52] U.S. Cl. .................................. 360/96.3; 242/199;
360/90
[58] Field of Search ............... 360/96.3, 93, 105, 74.1,
360/132, 96.1, 96.4, 84, 85, 90, 92; 242/192,
197, 198, 199, 200, 206, 209, 55.19 R; 226/178

[56] References Cited

U.S. PATENT DOCUMENTS 4,313,144 1/1982 Waddington ................. 242/199
4,370,686 1/1983 Katoh ......................... 360/96.3
4,468,711 8/1984 Schoenmakers ............ 360/96.3

Primary Examiner—Robert M. Kilgore
Attorney, Agent, or Firm—Guy W. Shoup

[57] ABSTRACT

A driving device for a tape recorder wherein means is provided for transmitting power from a motor to a capstan shaft which rotates unitarily with a flywheel, a rocking bracket is turnably mounted on an outer periphery of the capstan shaft, the rocking bracket is equipped with two transmission rollers which are rotatable on their respective axes, a belt is extended over the two transmission rollers, an outside surface of the belt is laid on a pulley which is fixed to the capstan shaft, a pair of reel shafts for taking up and rewinding a tape are disposed in a position where either of the two transmission rollers impinges on the reel shaft when the rocking bracket has turned, and the transmission rollers are provided with means for transmitting power to the reel shafts.

3 Claims, 4 Drawing Figures

DRIVING DEVICE FOR TAPE RECORDER

BACKGROUND OF THE INVENTION

The present invention relates to a transmission system in which a capstan shaft and reel shafts are driven and rotated by a single motor. More particularly, it relates to a driving device for a tape recorder which can be arranged in a small space and which generates little power transmission noise.

As the power transmission system of a tape recorder (especially, a tape recorder for microcassette tapes), there has been one in which both a capstan shaft and reel shafts are rotated by a single motor adapted to revolve forward and reversely. Prior-art driving devices of this type adopt a mechanism wherein a pulley which rotates with the capstan shaft is equipped with a directional clutch, by which the power transmission to the pair of reel shafts is selectively changed-over; a gearing which selectively meshes with the reel shafts in response to the rotation of the capstan shaft; etc. The prior-art devices accordingly have the disadvantage of loud driving noise, which might enter a built-in microphone for sound recording. In case of using the directional clutch, the problem of inferior change-over responsiveness is also involved.

SUMMARY OF THE INVENTION

The present invention has been made in order to eliminate the problems of the prior-art driving devices, and has for its object to provide a driving device for a tape recorder which is small enough to be arranged in a limited space and which generates little transmission noise.

In one aspect of performance of the present invention, a driving device for a tape recorder wherein a capstan shaft and a pair of reel shafts for taking up and rewinding a tape are driven and rotated by a motor, comprises a flywheel which is fixed to the capstan shaft and which rotates unitarily with said capstan shaft, means for transmitting power from the motor to said capstan shaft through said flywheel, a rocking bracket which is turnably mounted on an outer periphery of said capstan shaft, two transmission rollers which are disposed on said rocking bracket in a manner to be rotatable on their respective axes, a belt which is extended over said two transmission rollers, a pulley which is fixed to said capstan shaft and on which an outside surface of said belt is laid, the pair of reel shafts being disposed in a position where either of said two transmission rollers impinges on the corresponding reel shaft when said rocking bracket has turned, and means provided on said transmission rollers and for transmitting power to said reel shafts.

PREFERRED EMBODIMENTS OF THE INVENTION

Hereunder, embodiments of the present invention will be described with reference to the drawings.

Figure 1:
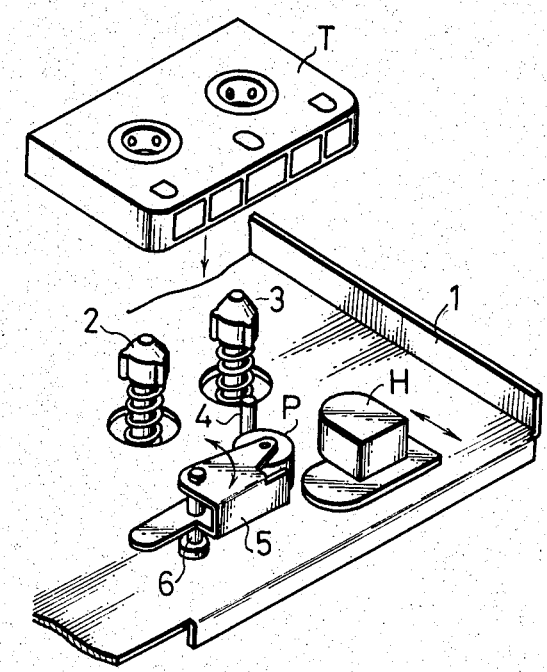
FIG. 1 is a perspective view showing the cassette tape loading portion of a tape recorder for a microcassette tape.

FIG. 1 shows in perspective, a cassette loading portion in a tape recorder which uses a microcassette tape T. Numeral 1 in the figure designates a chassis, on which are disposed a reel shaft 2 for taking up the tape, a reel shaft 3 for rewinding the shaft, a capstan shaft 4, a pinch roller P, a magnetic head H, etc. A bracket 5 holding the pinch roller P is so mounted that it can turn with a fulcrum at a pin 6 on the chassis 1. The magnetic head H is fixed on a head base (not shown) which is disposed in a manner to be slidable on the chassis 1. In accordance with the sliding operation of the head base, the magnetic head H can move in the direction of coming near to or away from the reel shafts 2 and 3. The bracket 5 holding the pinch roller P turns with the movement of the head base.

Figure 2:
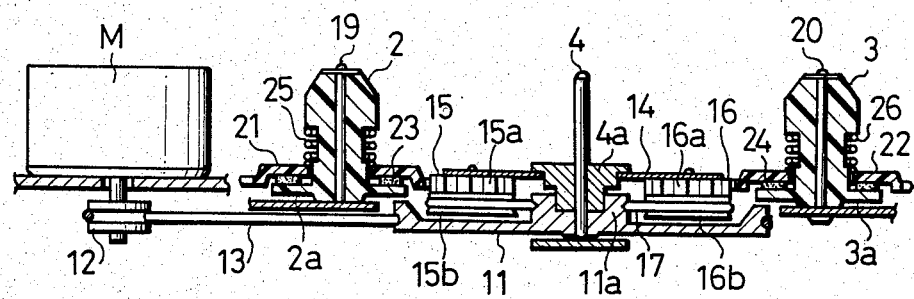
FIG. 2 is a vertical sectional view of a driving device for the tape recorder.
Figure 3:
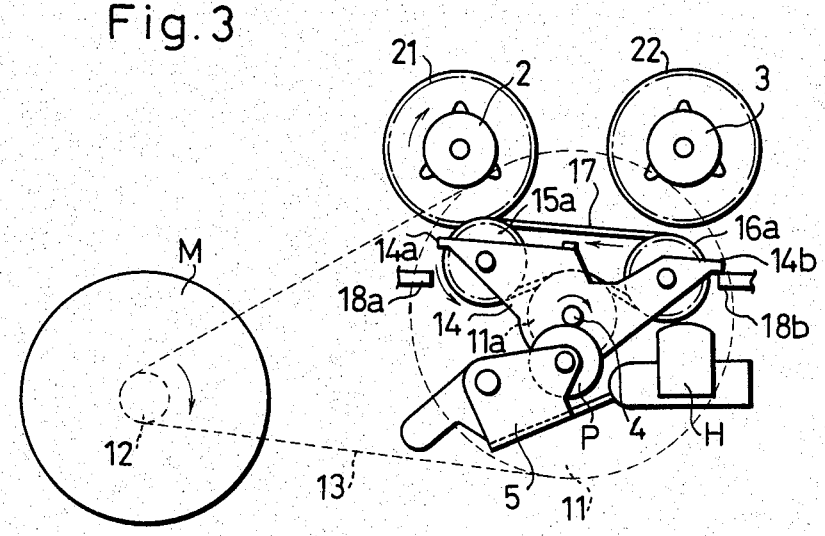
FIGS. 3 and 4 are plan views of the driving device.
Figure 4:
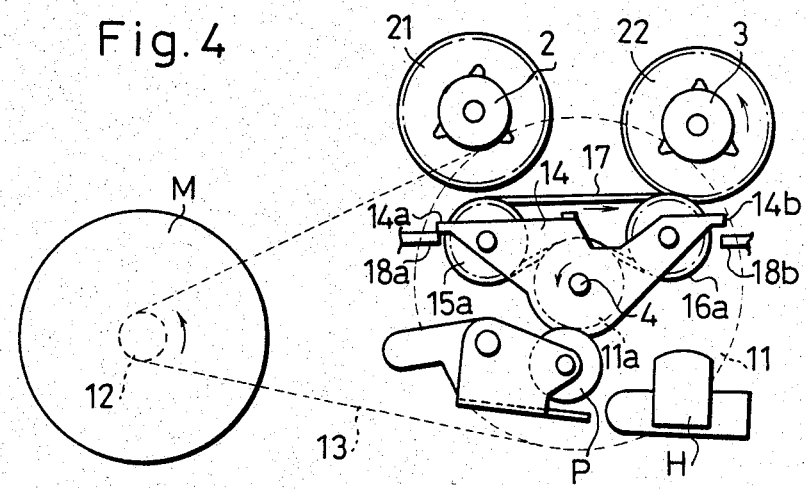

FIG. 2 shows a driving device for the reel shafts 2 and 3 and the capstan shaft 4 in section, while FIGS. 3 and 4 show the driving device in plan.

The capstan shaft 4 is rotatably mounted on the chassis 1, and a flywheel 11 underlying the chassis 1 is fixed to the lower end of the capstan shaft 4 (the chassis 1 is omitted from the illustration of FIG. 2). On the other hand, a motor M rotatable forward and reversely is provided with a pulley 12, and a transmission belt 13 is extended between the pulley 12 and the flywheel 11. A rocking bracket 14 is turnably mounted on a bearing 4a for the capstan shaft 4. Transmission rollers 15 and 16 are attached to both the end parts of the rocking bracket 14 in such a manner that both can revolve on their respective axes. The upper half parts of the transmission rollers 15, 16 are formed into toothed wheels 15a, 16a for transmitting power to the reel shafts 2, 3, while the lower half parts are formed into pulleys 15b, 16b. A belt 17 is extended over both the pulleys 15b, 16b, and the outside surface of an intermediate part of the belt 17 is extended over a pulley 11a which is integrally formed on the upper side of the flywheel 11. In addition, protrusions 14a and 14b are provided at both the ends of the rocking bracket 14. On the other hand, stoppers 18a, 18b on which the protrusions 14a, 14b abut are disposed on the lower side of the chassis 1.

The reel shafts 2, 3 are mounted on stationary pins 19, 20 in a manner to be revolvable on their respective axes, and flanges 2a, 3a are integrally formed at the lower ends of the respective reel shafts 2, 3. Gears 21, 22 are rotatably fitted on the respective reel shafts 2, 3, and felt rings 23, 24 are interposed between the gears 21, 22 and the flanges 2a, 3a. The gears 21, 22 are urged in the directions of coming into pressed contact with the felt rings 23, 24, by springs 25, 26 which are retained round the reel shafts 2, 3. As illustrated in FIGS. 3 and 4, the arrangement of the reel shafts 2, 3 and the capstan shaft 4 is in such a positional relation that, when the rocking bracket 14 has turned, either of the toothed wheels 15a, 16a selectively meshes with the gear 21 or 22.

The operations and effects of the present invention having the above construction will now be described.

FIG. 3 illustrates the state of the tape playback operation. At this time, the rotary shaft of the motor M is rotating in the direction of arrow (clockwise) at low speed. The rotation of the motor M is transmitted to the flywheel 11 by the transmission belt 13, so that the flywheel 11 as well as the capstan shaft 4 rotates in the direction of arrow. In addition, the pulley 11a which rotates unitarily with the flywheel 11 exerts a tension on the belt 17 which is extented over this pulley. As a result, the rocking bracket 14 is turned clockwise, and one toothed wheel 15a meshes with the gear 21 which is provided at the base part of the take-up reel shaft 2. At this time, the protrusion 14b provided at the right end part of the rocking bracket 14 abuts on the stopper 18b so as to control the clockwise turning of the rocking bracket 14, whereby the backlash between the toothed wheel 15a and the gear 21 becomes an appropriate value. The turning force of the flywheel 11 is transmitted to the belt 17 through the pulley 11a, so that a turning force is applied to the gear 21 from the toothed wheel 15a of the transmission roller 15 which is driven by the belt 17. Therefore, the take-up reel shaft 2 is rotated clockwise. On the other hand, the magnetic head H moves toward the reel shafts 2 and 3 along with the head base (not shown) and comes into contact with the surface of the cassette tape T. Further, the bracket 5 rotates until the pinch roller P comes into pressed contact with the capstan shaft 4.

In the state of FIG. 3, the loaded cassette tape T is held between the pinch roller P and the capstan shaft 4 and is delivered at a constant speed, and it is simultaneously taken up by the reel shaft 2. Sound reproduction or recording is performed by the magnetic head H.

When, in the state of FIG. 3, the pinch roller P is disengaged from the capstan shaft 4 and the magnetic head H is disengaged from the tape surface, and the motor M is rotated at high speed, the take-up reel shaft 2 rotates at high speed to perform the fast feed of the tape. Further, when the reel shaft 2 is rotated at high speed, and the magnetic head H is held in light contact with the tape surface in the state in which the pinch roller P is disengaged from the capstan shaft 4, the queuing operation is performed.

Now, FIG. 4 illustrates the state of the rewinding operation. At this time, the rotary shaft of the motor M is rotated in the direction of arrow (counterclockwise) at high speed. The rotation is transmitted to the flywheel 11 through the pulley 12 as well as the transmission belt 13, so that the flywheel 11 as well as the pulley 11a integral therewith and also the capstan shaft 4 rotate counterclockwise. The pulley 11a applies a tension to the belt 17, with the result that the rocking bracket 14 turns counterclockwise until the toothed wheel 16a of one transmission roller 16 meshes with the gear 22 provided at the base part of the reel shaft 3. In addition, the protrusion 14a at the left end part of the rocking bracket 14 abuts on the stopper 18a so as to control the counterclockwise turning of the rocking bracket 14, whereby the backlash between the toothed wheel 16a and the gear 22 is properly secured. The turning force of the flywheel 11 as well as the pulley 11a is transmitted to the transmission roller 16 through the belt 17, and is further transmitted to the gear 22 from the toothed wheel 16a of the transmission roller 16. Therefore, the rewinding reel shaft 3 rotates counterclockwise at high speed. In addition, the pinch roller P is disengaged from the capstan shaft 4, and the magnetic head H is disengaged from the surface of the cassette tape T.

As a result, the cassette tape T loaded on the chassis 1 is rewound at high speed.

When, in the state of FIG. 4, the magnetic head H is moved toward the reel shafts 2, 3 and is held in light contact with the tape surface, the review operation is performed.

In the illustrated embodiment, the toothed wheels 15a, 16a and gears 21, 22 have been used as the means for transmitting power from the transmission rollers 15, 16 to the reel shafts 2, 3. Another example of the means may be such that bands of rubber are wound round the transmission rollers 15, 16, while the reel shafts 2, 3 are provided with rollers instead of the gears 21, 22. In this case, the stoppers 18a, 18b are unnecessary, and the turning force of the rocking bracket 14 brings the transmission rollers 15, 16 into pressed contact with the rollers of the reel shafts 2, 3 and is frictionally transmitted.

As set forth above, according to the present invention, a rocking bracket mounted on the outer periphery of a capstan shaft is equipped with two transmission rollers, and a belt extended over the transmission rollers is extended over a pulley fixed to the capstan shaft, so as to rock and operate the rocking bracket in accordance with the tension of the belt, whereby power is selectively transmitted to reel shafts. Therefore, gear noise, clutch noise etc. are avoided to reduce operating machine noise. Accordingly, the mixing of noise into a built-in microphone etc. lessens. In addition, the belt extended between the transmission rollers is disposed in the recess of the flywheel of the capstan shaft, so that the whole mechanism can be thinned.

I claim:

1. A driving device for a tape recorder wherein a capstan shaft and a pair of reel shafts for taking up and rewinding a tape are driven and rotated by a motor, comprising a flywheel which is fixed to the capstan shaft and which rotates unitarily with said capstan shaft, means for transmitting power from the motor to said capstan shaft through said flywheel, a rocking bracket which is turnably mounted on an outer periphery of said capstan shaft, two transmission rollers which are disposed on said rocking bracket in a manner to be rotatable on their respective axes, a belt which is extended over said two transmission rollers, a pulley which is fixed to said capstan shaft and on which an outside surface of said belt is laid, the pair of reel shafts being disposed in a position where either of said two transmission rollers impinges on the corresponding reel shaft when said rocking bracket has turned, and means provided on said transmission rollers and for transmitting power to said reel shafts.

2. A driving device for a tape recorder as defined in claim 1, in which said pair of reel shafts are formed with gears, and said two transmission rollers are formed with toothed wheels, so that when said rocking bracket has turned, the toothed wheels of said transmission rollers selectively mesh with the gears of said reel shafts.

3. A driving device for a tape recorder as defined in claim 1, in which said pair of reel shafts are formed with rollers, and bands of rubber are wound round said two transmission rollers, so that when said rocking bracket has turned, the rubber bands of said transmission rollers selectively come into pressed contact with the rollers of said reel shafts so as to frictionally transmit a turning force.

* * * * *